UNITED STATES PATENT OFFICE 2,485,679

2-METHYL-4-PHENYLBENZOTHIAZOLE AND QUATERNARY SALTS THEREOF

Gertrude Van Zandt, Austin, Tex., and Leslie G. S. Brooker, Rochester, N. Y., assignors to Eastman Kodak Company, Rochester, N. Y., a corporation of New Jersey No Drawing. Application November 13, 1946, Serial No. 709,414

10 Claims. (Cl. 260—304)

This invention relates to 2-methyl-4-phenylbenzothiazole and quaternary salts thereof.

2-methyl-α-naphthothiazole and 2-methyl-β-naphthothiazole are well known bases which can be converted to quaternary salts which are valuable intermediates in the preparation of certain kinds of methine dyes, e. g. benzothiacyanine dyes.

We have now discovered a new base containing two benzene rings and a thiazole ring, the base differing from the known naphthothiazoles in that it contains a biphenyl nucleus rather than a naphthalene nucleus. Our new base can be represented by the following formula:

I

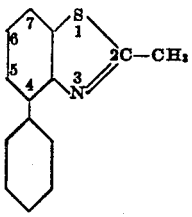

and can be called 2-methyl-4-phenylbenzothiazole. From our new base, quaternary salts can be made, and from these quaternary salts methine dyes which sensitize photographic emulsions can be prepared.

It is, accordingly, an object of our invention to provide 2-methyl-4-phenylbenzothiazole and a process for preparing the same. A further object is to provide quaternary salts of 2-methyl-4-phenylbenzothiazole and a process for preparing them. A further object is to provide methine dyes and processes for preparing them. A still further object is to provide photographic emulsions sensitized with such dyes. Other objects will become apparent hereinafter.

In accordance with our invention, we prepare 2-methyl-4-phenylbenzothiazole by oxidizing o-thioacetamidobiphenyl which has the following formula:

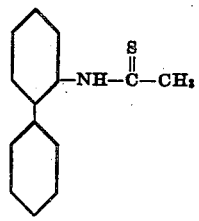

The oxidation is advantageously effected with an alkali metal ferricyanide, in the presence of an alkali metal hydroxide. o-Thioacetamidobiphenyl is advantageously prepared by heating o-acetamidobiphenyl with phosphorus pentasulfide. The following example will serve to illustrate further the manner of obtaining our new base.

*Example 1.—2-methyl-4-phenylbenzothiazole*

105.5 g. (1 mol.) of o-acetamidobiphenyl were dissolved in 500 cc. of dry toluene and heated in an oil bath at 120° C. 55.5 g. (.5 mol.) of phosphorus pentasulfide were added with mechanical stirring over a period of about ten minutes. Heating and stirring were continued for a further ten minutes and then the toluene solution was decanted from a sticky residue onto cracked ice. To this toluene-water mixture was added 150 cc. of 40 per cent sodium hydroxide and the mixture well stirred. The layers were allowed to separate. The toluene layer was treated with a further 150 cc. of 40 per cent sodium hydroxide. The aqueous alkaline solutions were combined, kept cold by addition of ice and then acidified by addition of acetic acid. o-Thioacetamidobiphenyl separated as a sticky mass. The liquors were decanted and the product redissolved in cold dilute sodium hydroxide. On acidification with acetic acid, the thio compound was again precipitated and was then collected on a filter. After again being dissolved in dilute sodium hydroxide, it was treated with an aqueous solution of 329 g. (2 mols.) of potassium ferricyanide and allowed to stand at 0° C. overnight. The 2-methyl-4-phenylbenzothiazole thus formed was taken up in 3.5 liters of ether. The ethereal solution was dried over anhydrous sodium sulfate. After evaporation of the solvent, the product was distilled and the fraction, boiling at 177–184° C. at 2 mm. of Hg pressure, was further purified by recrystallization from methyl alcohol and obtained as nearly colorless crystals, melting at 81–82° C.

To prepare quaternary salts from our new base, we heat the base with an alkyl salt, e. g. methyl, ethyl, n-propyl or n-butyl p-toluenesulfonate or benzenesulfonate, n-butyl chloride, n-propyl bromide, methyl, ethyl, n-propyl, n-butyl or isobutyl, iodide, dimethyl sulfate, diethyl sulfate, β-ethoxyethyl bromide, β-hydroxyethylbromide, carboxymethyl bromide, carbethoxymethyl bromide, benzyl iodide, allyl bromide, etc. The quaternary salts thus obtained can be converted to less soluble quaternary salts by double decomposition with water-soluble metal salts. Thus, the quaternary p-toluenesulfonates can be converted to the less soluble quaternary iodides by treatment of a hot alcoholic solution of a quaternary p-toluenesulfonate with an aqueous solution of an alkali metal iodide, e. g. potassium iodide. Similarly the quaternary iodides can be converted to the less soluble quaternary perchlorates by treatment of a hot alcoholic solution of a quaternary iodide with an aqueous solution of an alkali metal perchlorate, e. g. sodium perchlorate. Moreover, the less soluble quaternary salts can be converted to more soluble quaternary salts. Thus the quaternary iodides can be converted to quaternary chlorides by heating the quaternary iodides with silver chloride in a phenol, in accordance with the process set forth in United States Patent 2,245,249, dated June 10, 1941. The quaternary iodides can be converted to quaternary acetates by heating an ethyl alcoholic suspension of the quaternary iodide and silver acetate, filtering off the silver salts and recovering the quaternary acetate from the ethyl alcoholic solution. Our new quaternary salts can be represented by the following general formula:

II

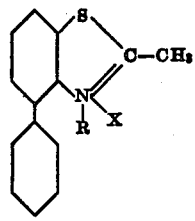

wherein R represents an alkyl group, i. e. an alcohol radical, e. g. methyl, ethyl, n-propyl, n-butyl, isobutyl, allyl, β-ethoxyethyl, β-hydroxyethyl, carboxymethyl, carbethoxymethyl, benzyl, etc. and X represents an anion, e. g. chloride, bromide, iodide, benzene-sulfonate, p-toluenesulfonate, methylsulfate, ethylsulfate, perchlorate, acetate, etc. Several examples further illustrating the formation of our new quaternary salts from alkyl salts will be found hereinafter as a part of examples illustrating the preparation of dyes.

Our new quaternary salts can be employed to prepare cyanine dyes which can be represented by the following general formula:

III

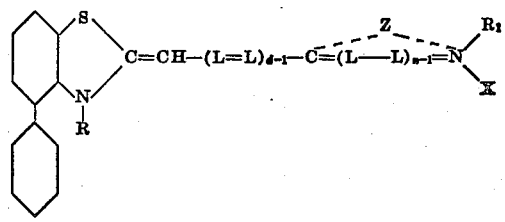

wherein $d$ represents a positive integer of from 1 to 4, $n$ represents a positive integer of from 1 to 2, L represents a methine group (i. e. —CH=, —C(CH$_3$)=, etc., R has the value given above, i. e. an alkyl group, R$_1$ represents an alkyl group which may be the same as, or different from R, X has the value given above, i. e. an anion, and Z represents the non-metallic atoms necessary to complete a heterocyclic nucleus containing from 5 to 6 atoms in the heterocyclic ring, e. g. a heterocyclic nucleus of the thiazole series (for instance thiazole, 4-methylthiazole, 4-phenylthiazole, 4,5-diphenylthiazole, etc.), a heterocyclic nucleus of the benzothiazole series (for instance benzothiazole, 5-chlorobenzothiaole, 6- chlorobenothiazole, 5-dimethylaminobenzothiazole, 6-methoxybenzothiazole, 6-methylbenzothiazole, 5-methylbenzothiazole, 5-bromobenzothiazole, 4-methoxybenzothiazole, 7-chlorobenzothiazole, etc.), a heterocyclic nucleus of the naphthothiazole series (for instance α-naphthothiazole, β-naphthothiazole, etc.), a heterocyclic nucleus of the selenazole series (for instance selenazole, 4-methylselenazole, 4-phenylselenazole, etc.), a heterocyclic nucleus of the benzoselenazole series (for instance benzoselenazole, 5-chlorobenzoselenazole), a heterocyclic nucleus of the benzoxazole series (for instance benzoxazole, 5-phenylbenzoxazole, 5-chlorobenzoxazole, 5-methoxybenzoxazole, etc.), a heterocyclic nucleus of the quiniline series (for instance quinaline, 6-methoxyquinoline, 6-chloroquinoline, etc.), etc.

To obtain monomethine cyanine dyes of the above general Formula III wherein $d$ represents 1, we condense a quaternary salt of 2-methyl-4-phenylbenzothiazole (represented by Formula II above) with a cyclammonium quaternary salt selected from those represented by the following general formula:

IV

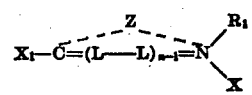

wherein L, $n$, R$_1$, X and Z have the values given above and X$_1$ represents a member selected from the group consisting of a halogen atom having an atomic weight between 35 and 127, and a thioether group. Typical of such cyclammonium quaternary salts are: 2-iodoquinoline methiodide, ethiodide, n-propiodide or n-butiodide, 2-iodoquinoline benziodide, 2-bromoquinoline propobromide, 4-chloroquinoline metho-p-toluenesulfonate, 2-n-butylmercaptoquinoline ethiodide, 2-phenylmercaptoquinoline ethiodide, 2-β-naphthylmercaptoquinoline ethiodide, 2-p-chlorophenylmercaptoquinoline ethiodide, 2-methylmercaptobenzothiazole metho-p-toluenesulfonate, 2-ethylmercapto-5,6-dioxymethylbenzothiazole etho-p-toluenesulfonate, 2-methylmercaptobenzoxazole etho-p-toluenesulfonate, 4-phenylmercaptopyridine ethiodide, 4-phenylmercaptoquinoline ethiodide, 2-methylmercapto-β-naphthothiazole metho-p-toluenesulfonate, 2-methylmercapto-β-naphthoxazole p-toluenesulfonate, etc.

The condensations are advantageously carried out in the presence of a basic condensing agent (acid-binding agent), e. g. a tertiary amine, especially a tertiary amine having an ionization constant greater than 10$^{-5}$ at 25° C., e. g. trialkylamines (trimethylamine, triethylamine, tri-n-propylamine, tri-n-butylamine, etc.), trihydroxyalkylamines (triethanolamine, tripropanolamine, etc.), N-alkylpiperidine (N-methylpiperidine, N-ethylpiperidine, etc.) and so forth. Alkali metal carbonates, e. g. sodium and potassium carbonate, can also be employed as basic condensing agent. The condensations are advantageously carried out in a solvent, especially an alcohol, e. g. ethyl, n-propyl, isobutyl or n-butyl alcohol, i. e. an alcohol of the formula C$_n$H$_{2n+1}$ wherein $n$ represents a positive integer of from 1 to 4. Pyridine can also be used as a solvent.

To obtain trimethine cyanine dyes of the above general Formula III wherein $d$ represents 2, we condense a quaternary salt of 2-methyl-4-phenylbenzothiazole (represented by Formula II above) with a cyclammonium quaternary salt selected from those represented by the following general formula:

V 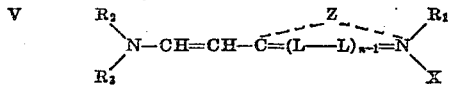

wherein $n$, $R_1$, X and Z have the values given above, and $R_2$ represents an aryl group, e. g. phenyl, p-chlorophenyl, p-tolyl, etc. and $R_3$ represents a member selected from the group consisting of a hydrogen atom, an alkyl group (especially methyl or ethyl) and an acyl group (especially acetyl, propionyl or butyryl). Typical of such cyclammonium quaternary salts are: 2-β-acetanilidovinlbenzoxazole ethiodide, 2-β-acetanilidovinylbenzothiazole ethiodide, 2-β-acetanilidovinylquinoline ethoidide, 4-β-acetanilidovinylquinoline n-butiodide, 2-β-acetanilidovinyl-β-naphthothiazole ethiodide, 2-anilinovinylthiazoline methiodide, 2-β-acetanilidovinylbenzothiazole pheniodide, 2-β-acetanilidovinylbenzoselenazole ethiodide, 2-β-acetanilidovinyl-4-methylthiazole methiodide, 2-β-acetanilidovinyl-4-phenylthiazole ethiodide, 2-β-acetanilidovinyl-3,3'-dimethylindolenine methiodide, 2-[2-(N-methylanilino) vinyl]-benzothiazole ethiodide, 2-β-acetanilidovinyl)-3,4-trimethylenebenzothiazolium iodide, etc.

These condensations which give the trimethine cyanine dyes are advantageously carried out in the presence of a basic condensing agent (acid-binding agent), e. g. a tertiary amine, especially a tertiary amine having an ionization constant greater than $10^{-5}$ at 25° C., e. g. trialkylamines (trimethylamine, triethylamine, tri-n-propylamine, tri-n-butylamine, etc.), trihydroxyalkylamines (triethanolamine, tripropanolamine, etc.), N-alkylpiperidines (N-methylpiperidine, N-ethylpiperidine, etc.) and so forth. The condensations are advantageously carried out in a solvent, especially an alcohol, e. g. ethyl, n-propyl, isobutyl or n-butyl alcohol, i. e. an alcohol of the formula $C_nH_{2n+1}OH$ wherein $n$ represents a positive integer of from 1 to 4. Pyridine is likewise an efficacious solvent and in some cases suffices as basic condensing agent.

To prepare symmetrical trimethine dyes of the above general Formula III (i. e. where $d$ equals two, $n$ equals one and Z represents the non-metallic atoms necessary to complete a 4-phenylbenzothiazole nucleus), we condense a quaternary salt of 2-methyl-4-phenylbenzothiazole (Formula II above) with an orthocarboxylic ester. Typical esters of orthocarboxylic acids include: triethyl orthoformate, tri-n-propyl orthoformate, tri-n-butyl orthoformate, triethyl orthoacetate, triethyl orthopropionate, triethyl orthophenylacetate, triethyl orthobenzoate, trimethyl ortho-n-valerate, methyl diethyl ortho-n-caproate, methyl diethyl orthoisocaproate, trimethyl ortho-p-toluate, etc. The condensations are advantageously effected in pyridine or quinoline.

To prepare trimethine cyanine dyes of the above general Formula III (wherein $d$ represents two) we can also condense a quaternary salt of 2-methyl-4-phenylbenzothiazole (represented by Formula II above) with a cyclammonium quaternary salt selected from those represented by the following general formula:

VI 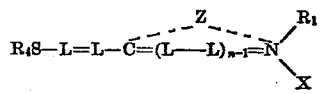

wherein L, $n$, $R_1$, X and Z have the values given above and $R_4$ represents an alkyl group, e. g. methyl, ethyl, n-butyl, etc. Typical of the quaternary salts set forth by Formula VI are: 2-(2-methylmercapto-1-butenyl) benzothiazole metho-p-toluenesulfonate, 2-(2-methylmercaptopropenyl)-β-naphthothiazole metho-p-toluenesulfonate, 2-(2-methylmercaptopropenyl)-3,4-trimethylenebenzothiazolium-p-toluenesulfonate, 2-(2-methylmercaptopropenyl)benzothiazole etho-p-toluenesulfonate, 2-(2-methylmercapto-1-butenyl)-benzothiazole metho-p-toluenesulfonate, 5-chloro-2-(2-methylmercapto-1-butenyl)benzoselenazole metho-p-toluenesulfonate, 2-(2-methylmercaptostyryl)-β-naphthothiazole ethiodide, 5-chloro-2-(2-methylmercaptopropenyl)benzothiazole ethiodide, 2-(2-methylmercaptopropenyl)quinoline etho-p-toluenesulfonate, 2-(2-methylmercapto-1-butenyl)quinoline metho-p-toluenesulfonate, 2-(2-methylmercaptopropenyl)-4-phenylthiazole etho-p-toluenesulfonate, 2-(1-methyl-2-methylmercapto-1-butenyl)benzothiazole metho-p-toluenesulfonate 2-(β-cyclopropyl-β-methylmercaptovinyl)benzothiazole metho-p-toluenesulfonate, 2-(β-cyclopropyl-β-methylmercaptovinyl)-β-naphthothiazole metho-p-toluenesulfonate, 5-chloro-2-(β-cyclopropyl-β-methylmercaptovinyl)benzothiazole metho-p-toluenesulfonate, 2-(β-cyclopropyl-β-methylmercaptovinyl)benzoselenazole metho-p-toluenesulfonate, 2-(β-cyclobutyl-p-methylmercaptovinyl)-benzothiazole metho-p-toluenesulfonate, 2-(β-cyclohexyl-β-methylmercaptovinyl)benzothiazole metho-p-toluenesulfonate, 3,3-dimethyl-2-(β-methylmercaptovinyl)indolenine metho-methyl sulfate, etc. Many of these β-alkylmercaptoalkenyl compounds are known substances. Others are described in the copending applications of Grafton H. Keyes, Serial No. 597,149, filed June 1, 1945, now U. S. Patent 2,429,469; 620,161, filed October 3, 1945 and 620,162, filed October 3, 1945. These condensations to give trimethine cyanine dyes are advantageously carried out in the presence of a basic condensing agent and solvent, e. g. the basic condensing agents and solvents set forth above under the condensations involving the cyclammonium quaternary salts of Formula V.

To prepare pentamethine cyanine dyes of the above general Formula III (wherein $d$ represents three), we condense a quaternary salt of 2-methyl-4-phenylbenzothiazole (represented by Formula II above) with a cyclammonium quaternary salt selected from those represented by the following general formula:

VII 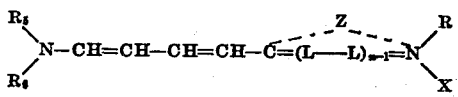

wherein $n$, L, R, X and Z have the values given above, $R_5$ represents a member selected from the group consisting of a hydrogen atom and an alkyl group (especially methyl or ethyl) and an acyl group (especially acetyl, propionyl or butyryl), and $R_6$ represents an aryl group, e. g. phenyl. Typical of such cyclammonium quaternary salts are: 4-(4-acetanilido-1,3-butadienyl)quinoline ethiodide, 2-(4-anilino-1,3-butadienyl)benzothiazole ethiodide, 2-(4-anilino-1,3-butadienyl)-5,6-dimethoxybenzothiazole ethiodide, 2-(4-anilino-1,3-butadienyl)-α-naphthothiazole ethiodide, 2-(4-anilino-1,3-butadienyl)-5-methoxybenzoselenazole ethiodide, 2-(4-anilino-1,3-butadienyl)-6-methylquinoline ethiodide, 2-(4-anilino-3-methyl-1,3-butadienyl)benzothiazole ethiodide, etc.

These condensations are advantageously carried out in the presence of a basic condensing agent and solvent, e. g. the basic condensing agents and solvents set forth above under the condensations involving the cyclammonium quaternary salts of Formula V.

To prepare symmetrical pentamethine dyes of the above Formula III (i. e. where $d$ equals three, $n$ equals one and Z represents the non-metallic atoms necessary to complete a 4-phenyl-benzothiazole nucleus), we condense at least two molecular proportions of a quaternary salt of 2-methyl-4-phenylbenzothiazole (Formula II above) with one molecular proportion of a β-arylaminoacrolein anil salt, e. g. β-anilinoacrolein anil hydrochloride. The condensations are advantageously carried out in the presence of a basic condensing agent and solvent; advantageously the alcohol solvents and tertiary amines set forth above which have an ionization constant at 25° C. greater than $10^{-5}$.

To prepare heptamethine cyanine dyes of the above general Formula III (wherein $d$ represents five), we condense a quaternary salt of 2-methyl-4-phenylbenzothiazole (represented by Formula II above) with a cyclammonium quaternary salt selected from those represented by the following general formula:

VIII

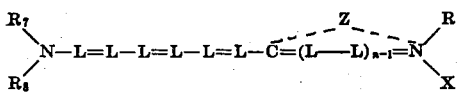

wherein $n$, L, R, X and Z have the values given above, $R_7$ represents a member selected from the group consisting of a hydrogen atom and an alkyl group (especially methyl and ethyl) and an acyl group (especially acetyl, propionyl or butyryl) and $R_8$ represents an aryl group, e. g. phenyl. Typical of such cyclammonium quaternary salts are: 2-(6-anilino-1,3,5-hexatrienyl)-benzothiazole ethiodide, 2-(6-acetanilido-1,3,5-hexatrienyl)benzothiazole ethiodide, 2-(6-acetanilido-1,3,5-hexatrienyl)benzoxazole ethiodide, 2-[6 - (N - methylanilino) - 1,3,5 - hexatrienyl]-benzoselenazole ethiodide, 6-methyl - 2 - [6 - (N-methylanilino) - 1,3,5 - hexatrienyl] - quinoline ethiodide, 4-[6-(N-methylanilino) - 1,3,5 - hexatrienyl]-quinoline methiodide, etc. The condensations are advantageously carried out in the presence of a basic condensing agent and solvent, e. g. the basic condensing agents and solvents set forth above under the condensations involving the cyclammonium quaternary salts of Formula V.

To prepare symmetrical heptamethine dyes of the above Formula III (i. e. where $d$ represents four, $n$ equals 1 and Z represents the non-metallic atoms necessary to complete a 4-phenylbenzothiazole nucleus), we condense at least two molecular proportions of a quaternary salt of 2-methyl-4-phenylbenzothiazole (Formula II above) with one molecular proportion of a glutaconic aldehyde dianilide salt, e. g. glutaconic dianilide hydrochloride. The condensations are advantageously carried out in presence of a basic condensing agent and solvent; advantageously the alcohol solvents and tertiary amines set forth above which have an ionization constant at 25° C. greater than $10^{-5}$. Secondary amines having such ionization constants, e. g. piperidine, diethylamine, etc. can also be used.

Our new quaternary salts can be employed to prepare merocyanine dyes which can be represented by the following general formula:

IX

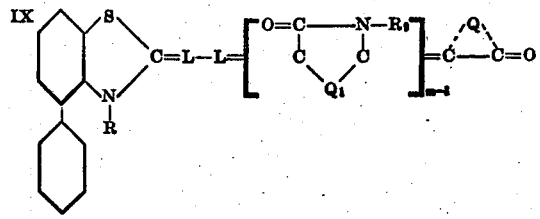

wherein L and R have the values given above, $m$ represents a positive integer of from 1 to 2, $Q_1$ represents an oxygen atom, a sulfur atom or a group of the formula

wherein R′ represents an alcohol radical (i. e. an alkyl group, substituted or unsubstituted) or an aryl group, $R_9$ represents a member selected from the group consisting of an alkyl group and an aryl group, and Q represents the non-metallic atoms necessary to complete a heterocyclic nucleus containing from 5 to 6 atoms in the heterocyclic ring, e. g. a rhodanine nucleus, a 2-thio-2,4(3,5-oxazoledione nucleus, a 2-thiohydantoin nucleus, a 5-pyrazolone nucelus, a 2,4(3,5)-thiazoledione nucleus, a 4(5)-thiazolone nucleus, a barbituric acid nucleus, a thiobarbituric acid nucleus, etc.

To prepare merocyanine dyes of the above general Formula IX (wherein $m$ represents 1) we condense a quaternary salt of 2-methyl-4-phenylbenzothiazole (Formula II above) with an arylaminomethylene compound of the following general formula:

X

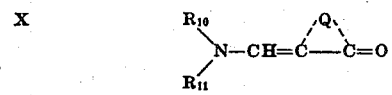

wherein Q has the value given above, $R_{10}$ represents a member selected from the group consisting of a hydrogen atom, and an acyl group (especially acetyl, propionyl or butyryl) and $R_{11}$ represents an aryl group, e. g. phenyl or naphthyl. Typical of such arylaminomethylene compounds are: 5 - anilinomethylrhodanine, 5 - acetanilidomethylene-3-ethylrhodanine, 5-acetanilidomethylene-3 - phenylrhodanine, 5-acetanilidomethylene-3-ethyl-2-thio-2,4(3,5) -oxazoledione, 5-acetanilidomethylene - 3 - ethyl-1-phenyl-2-thio-hydantoin, 4-acetanilidomethylene - 3 - methyl - 1-phenyl-5-pyrazolone, 5-acetanilidomethylene-2-diphenylamino-4(5)-thiazolone, etc.

These condensations are advantageously carried out in the presence of a basic condensing agent and solvent, advantageously the alcohol solvents and tertiary amines which have an ionization constant at 25° C. greater than $10^{-5}$ which are set forth above.

The merocyanine dyes of the above general Formula IX (wherein $m$ represents 1) can also be prepared by condensing a quaternary salt of 2-methyl - 4 - phenylbenzothiazole (Formula II above) with an ester of an orthocarboxylic acid and a ketomethylene compound of the following general formula:

XI

wherein Q has the value given above. Typical of such ketomethylene compounds are: rhodanine, 3-ethylrhodanine, 3-phenylrhodanine, 3 - β - hydroxyethylrhodanine, 3-ethyl-2 - thio - 2,4(3,5)- oxazoledione, 3-ethyl-1-phenyl-2-thiohydantoin, 3-methyl-1-phenyl-5-pyrazolone, 2-diphenylamino-4(5)-thiazolone, 2-ethylphenylamino-4(5)-thiazolone, barbituric acid, thiobarbituric acid, etc.

Typical esters of orthocarboxylic acids are given above. The condensations are advantageously effected in the presence of a basic condensing agent and solvent. The alcoholic solvents and tertiary organic amines having an ionization constant at 25° C. greater than $10^{-5}$ which are set forth above are advantageously employed.

To prepare merocyanine dyes of the above general formula IX (wherein m represents 2) we treat a merocyanine dye of the following general formula:

XII

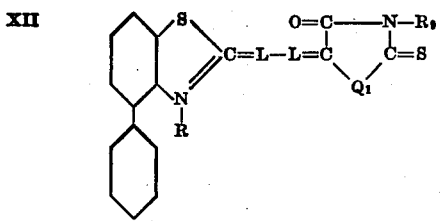

wherein L, $Q_1$ R and $R_9$ have the values given above with an alkyl salt to obtain a quaternary alkylmercapto compound of the following general formula:

XIII

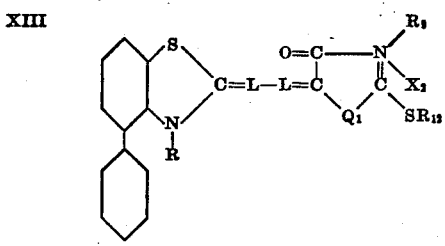

wherein L, $Q_1$, R, and $R_9$ have the values given above, and $R_{12}$ represents an alcohol radical (i. e. an alkyl group, substituted or unsubstituted) and $X_2$ represents an anion. We then condense the quaternary alkylmercapto compound with a heterocyclic compound containing 5 to 6 atoms in the ring and containing in the ring a ketomethylene (—CH$_2$—CO—) group. These condensations which give the complex merocyanine dyes of Formula IX above (wherein m represents 2) are advantageously carried out in the presence of a basic condensing agent, e. g. a trialkylamine, pyridine or a N-alkylpiperidine or an alkali metal carbonate, using a lower molecular weight alcohol as reaction medium.

The following examples will serve to illustrate further the manner of obtaining our new dyes.

*Example 2. — 3 - ethyl - 3' - methyl - 4 - phenylthiacyanine bromide*

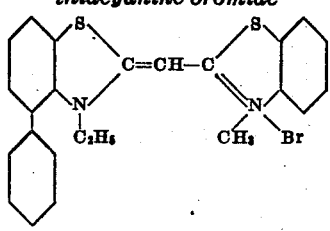

1.13 g. (1 mol.) of 2-methyl-4-phenylbenzothiazole and 0.77 g. (1 mol.) of diethyl sulfate were heated together in an oil bath at 110–115° C., for about 9 days. To the resulting crude quaternary salt were added 1.53 g. (1 mol.) of 2-methylmercaptobenzothiazole metho-methylsulfate, 15 cc. of ethyl alcohol and 0.56 g. (1 mol.+10 per cent excess) of triethylamine. The reaction mixture was heated at the refluxing temperature for 30 minutes. Diethyl ether (200 cc.) was added to the cool mixture and the whole chilled at 0° C. The suspension was filtered, and the hot methyl alcoholic solution of the residue was treated with a hot solution of potassium bromide (3 g.) in water (30 cc.). After chilling at 0° C., the dye was collected on a filter and washed with water and then acetone. The yield of dye was 14 per cent crude and 8 per cent after two recrystallizations from methyl alcohol. The greenish-yellow crystals had a melting point of 262–263° C., with decomposition, and they sensitized a photographic gelatino-silver-chlorobromide emulsion to about 470 m$\mu$ with maximum sensitivity at about 450 m$\mu$.

*Example 3.—1'-butyl-3-ethyl-4-phenylthia-4'-carbocyanine iodide*

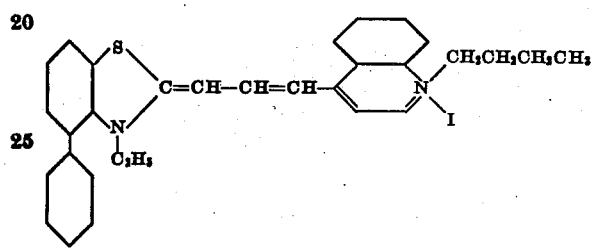

.56 g. (1 mol.) of 2-methyl-4-phenylbenzothiazole and .5 g. (1 mol.) of ethyl-p-toluenesulfonate were heated together in an oil bath at 115° C. for one week. To the quaternary salt thus formed was added 1.18 g. (1 mol.) of 4-$\beta$-acetanilidovinylquinoline n-butiodide and 10 cc. of pyridine and the mixture refluxed for ten minutes. After chilling, dye was precipitated on addition of diethyl ether. It was washed with water, acetone and then given several recrystallizations from methyl alcohol. It was obtained as coppery needles melting at 212 to 215° C. with decomposition. The yield of dye was 24 per cent crude and 17 per cent after two recrystallizations from methyl alcohol (140 cc. per gram of dye). The dye sensitized a photographic gelatino - silver - bromoiodide emulsion from about 570 m$\mu$ to about 705 m$\mu$ with maximum sensitivity at about 670 m$\mu$.

*Example 4.—9-ethyl-3,3'-dimethyl-4,4'-diphenylthiacarbocyanine iodide*

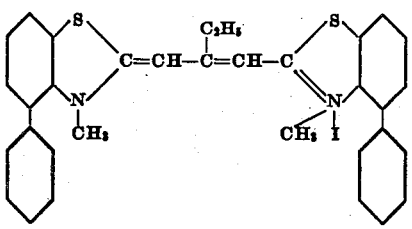

1.5 g. (2 mols.) of 2-methyl-4-phenylbenzothiazole and 1.24 g. (2 mols.) of methyl p-toluenesulfonate were heated together in an oil bath at 115–120° C. for 16 hours. To the resulting crude quaternary salt were added 10 cc. of dry pyridine and 1.76 g. (1 mol. + 200 per cent excess) of ethyl orthopropionate. The reaction mixture was heated at the refluxing temperature for 45 minutes. After cooling the dye was precipitated by adding diethyl ether. The ether-pyridine layer was decanted. The hot methyl alcoholic solution of the residue was treated with a hot solution of potassium iodide (3 g.) in water. After chilling, the dye was collected on a filter and washed with water. The yield of dye was 11 per cent after two recrystallizations from methyl alcohol (135 cc. per gram of dye). The small bronze crystals had a melting point of 166–169° C. with decomposition, and they sensitized a photographic gelatino-silver-bromoiodide emulsion to about 640 mμ with maximum sensitivity at about 595 mμ.

*Example 5.—3,3'-diethyl-4,4'-diphenylthia- carbocyanine bromide*

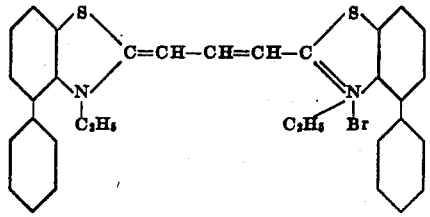

1.5 g. (2 mols.) of 2-methyl-4-phenylbenzo- thiazole and 1.33 g. (2 mols.) of ethyl p-toluene- sulfonate were heated together in an oil bath at 115–120° C. for one week. To the resulting crude quaternary salt were added 10 cc. of dry pyridine and 1.48 g. (1 mol. + 200 per cent excess) of ethyl orthoformate, and the reaction mixture was heated at the refluxing temperature for 45 minutes. Diethyl ether was added to the cool mixture and after chilling the whole at 0° C., the ether-pyridine layer was decanted. The residue was dissolved in methyl alcohol and the hot alcoholic solution was treated with a hot solution of potassium bromide (3 g.) in water. After chilling at 0° C., the dye was collected on a filter and washed with water. The yield of dye was 35 per cent crude and 24 per cent after two recrystallizations from methyl alcohol (130 cc. per gram of dye). The golden-bronze prisms had a melting point of 250–252° C. with decomposition, and they sensitized a photographic gelatino-silver-bromoiodide emulsion to about 650 mμ with maximum sensitivity at about 600 mμ.

*Example 6.—3,3'-diethyl-4,4'-diphenyl- thiadicarbocyanine iodide*

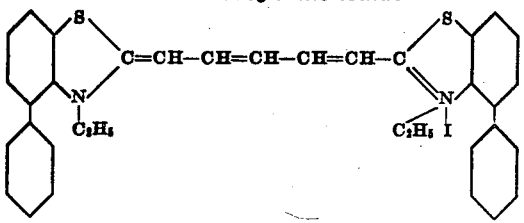

2.25 g. (2 mols.) of 2-methyl-4-phenylbenzo- thiazole and 2.00 g. (2 mols.) of ethyl p-toluene- sulfonate were heated together in an oil bath at 115–120° C. for one week. To the resulting crude quaternary salt were added 1.29 g. (1 mol.) of β-anilino-acroleinanil hydrochloride, 10 cc. of ethyl alcohol and 1.01 g. (2 mols.) of triethyl- amine, and the reaction mixture was heated at the refluxing temperature for 15 minutes. Diethyl ether was added to the cool reaction mixture and after chilling the whole at 0° C., the ether-ethyl alcohol layer was decanted. The residue was dissolved in methyl alcohol and the hot alcoholic solution was treated with a hot solution of potassium iodide (3 g.) in water. After chilling at 0° C., the dye was collected on a filter and washed with water. The yield of dye was 14 per cent crude and 4 per cent after two recrystallizations from methyl alcohol. The metallic prisms had a melting point of 184–185° C. with decomposition, and they sensitized a photographic gelatino-silver-bromoiodide emulsion from about 660 mμ to about 730 mμ with maximum sensitivity at about 700 mμ.

*Example 7.—3,3'-diethyl-4,4'-diphenyl- thiatricarbocyanine bromide*

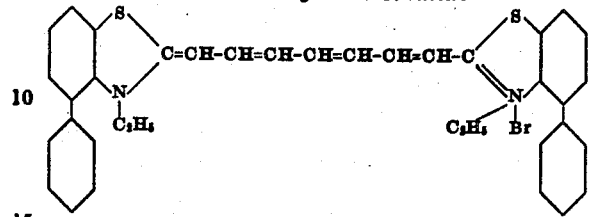

1.5 g. (2 mols.) of 2-methyl-4-phenylbenzo- thiazole and 1.35 g. (2 mols.) of ethyl p-toluene- sulfonate were heated together in an oil bath at 115–120° C. for one week. The crude quaternary salt was dissolved in 10 cc. of ethyl alcohol and the solution was chilled in ice-water. To this cold solution were added 0.93 g. (1 mol.) of gluta- conic aldehydedianilide hydrochloride and 0.57 g. of piperidine and the reaction mixture was kept at 5 to 10° C. for 27 hours. Diethyl ether was added and the whole was chilled at 0° C. The ether-alcohol layer was decanted. The residue was dissolved in methyl alcohol and the hot alcoholic solution was treated with a hot solution of potassium bromide (3 g.) in water. After chilling at 0° C., the dye was collected on a filter and washed with water. The yield of dye was 41 per cent crude and 30 per cent after two recrystallizations from methyl alcohol (240 cc. per gram of dye). The minute green needles with a metallic reflex had a melting point of 180–181° C. with decomposition, and they sensitized a photographic gelatino-silver-bromoiodide emulsion from about 760 mμ to about 850 mμ with maximum sensitivity at about 815 mμ.

*Example 8.—3,3'-diethyl-9-methyl-4,4'-diphenyl thiacarbocyanine iodide*

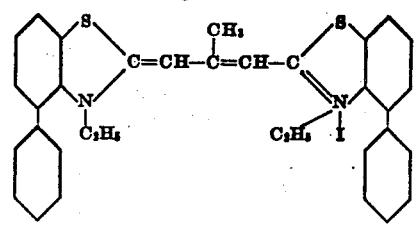

1.5 g. (2 mols.) of 2-methyl-4-phenylbenzo- thiazole and 1.33 g. (2 mols.) of ethyl p-toluene- sulfonate were heated together in an oil bath at 115–120° C. for one week. To the crude quaternary salt were added 10 cc. of dry pyridine and 1.20 g. (1 mol.+200 per cent excess) of methyl orthoacetate and the reaction mixture was heated at the refluxing temperature for 45 minutes. Diethyl ether was added to the cold mixture and the whole was chilled at 0° C. The ether-pyridine layer was decanted. The residue was dissolved in methyl alcohol and the hot alcoholic solution was treated with a hot solution of potassium iodide (3 g.) in water. After chilling at 0° C., the dye was collected on a filter and washed with water. The yield of dye was 24 per cent crude and 16 per cent after three recrystallizations from methyl alcohol (135 cc. per gram of dye). The green crystals with bronze reflex decomposed at 185° C. with softening from 176° C., and they sensitized a photographic gelatino-silver-bromoiodide emulsion to about 650 mμ with maxima sensitivity at about 540 and 580 mμ.

Example 9.—1',3-diethyl-6'-methoxy-4-phenyl-thia-2'-cyanine bromide

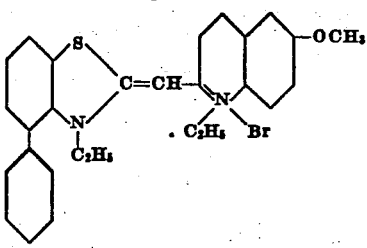

1.13 g. (1 mol.) of 2-methyl-4-phenylbenzothiazole and 1.00 g. (1 mol.) of ethyl p-toluenesulfonate were heated together in an oil bath at 115–120° C. for six days. To the crude quaternary salt were added 2.19 g. (1 mol.) of 6-methoxy-2-phenylmercaptoquinoline etho-p-toluenesulfonate, 10 cc. of ethyl alcohol and 0.51 g. (1 mol.) of triethylamine and the reaction mixture was heated at the refluxing temperature for 20 minutes. Diethyl ether was added to the cold mixture and the whole was chilled at 0° C. The ether-alcohol layer was decanted. The residue was dissolved in methyl alcohol and the hot alcoholic solution was treated with a hot solution of potassium bromide (3 g.) in water. After chilling at 0° C., the dye was collected on a filter and washed with water. The yield of dye was 27 per cent crude and 11 per cent after two recrystallizations from methyl alcohol (65 cc. per gram of dye). The orange crystals had a melting point of 245–247° C. with decomposition, and they sensitized a photographic gelatino-silver-bromoiodide emulsion to about 560 mμ with maximum sensitivity at about 525 mμ.

Example 10.—3 - ethyl - 5 - [(3 - ethyl-4-phenyl-2(3) - benzothiazolylidene) - ethylidene]rhodanine

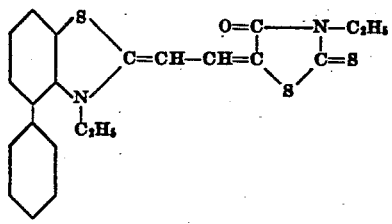

2.25 g. (1 mol.) of 2-methyl-4-phenylbenzothiazole and 2.00 g. (1 mol.) of ethyl p-toluenesulfonate were heated together in an oil bath at 115–125° C. for one week. To the crude quaternary salt were added 3.06 g. (1 mol.) of 5-acetanilidomethylene-3-ethylrhodanine, 25 cc. of ethyl alcohol and 1.01 g. (1 mol.) of triethylamine and the reaction mixture was heated at the refluxing temperature for 15 minutes. After chilling at 0° C., the dye was collected on a filter. The yield of dye was 68 per cent crude and 37 per cent after one recrystallization from pyridine. The reddish needles with blue reflex had a melting point of 270–271° C. with decomposition, and they sensitized a photographic gelatino-silver-bromoiodide emulsion to about 640 mμ with maximum sensitivity at about 600 mμ. The yield of 3-ethyl-5-[(3 - methyl - 4 - phenyl - 2(3) - benzothiazolylidene)ethylidene]rhodanine was 72 per cent crude and 52 per cent after two recrystallizations from pyridine (10 cc. per gram of dye). The red crystals with bluish reflex had a melting point of 249–250° C. with decomposition, and they sensitized a photographic gelatino-silver-bromoiodide emulsion to about 635 mμ with maximum sensitivity at about 595 mμ.

Example 11.—3 - ethyl - 5-[(3-methyl-4-phenyl-2(3) - benzothiazolylidene) - ethylidene]-2-(3-ethyl - 4 - oxo-2-thiono-5-thiazolidylidene) -4-thiazolidone

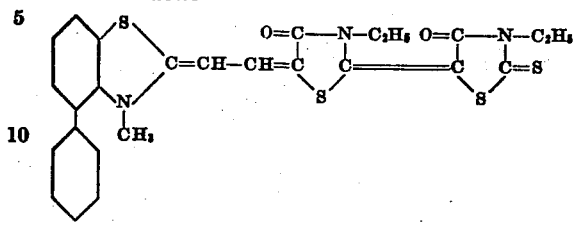

3.0 g. (1 mol.) of 3-ethyl-5-[(3-methyl-4-phenyl - 2(3) - benzothiazolylidene) ethylidene]rhodanine and 5.44 g. (1 mol. + 300 per cent excess) of methyl p-toluenesulfonate were heated together in an oil bath at 150–160° C. for 45 minutes. The cool addition product was washed with several portions of ether. The residue of dark green crystals was stirred with acetone and after chilling the suspension the addition product was collected on a filter; the yield was 94 per cent.

2.1 g. (1 mol.) of the above addition product, 0.57 g. (1 mol.) of 3-ethylrhodanine, 20 cc. of ethyl alcohol and 0.36 g. (1 mol.) of triethylamine were heated at the refluxing temperature for 20 minutes. After chilling at 0° C., the dye was collected on a filter and washed with methyl alcohol. The yield of dye was 84 per cent crude and 49 per cent after two recrystallizations from pyridine (95 cc. per gram of dye). The minute green crystals had a melting point of 314–316° C. with decomposition, and they sensitized a photographic gelatino-silver-bromoiodide emulsion to about 690 mμ with maximum sensitivity at about 640 mμ.

The yield of 3-ethyl-2-(3-ethyl-4-oxo-2-thiono - 5 - thiazolidylidene) - 5 - [(3 - ethyl - 4-phenyl-2(3)-benzothiazolylidene)-ethylidene]-4-thiazolidone was 83 per cent crude and 70 per cent after two purifications by dissolving the dye in hot pyridine and adding an equal volume of methyl alcohol. The minute dark green crystals had a melting point of 295–297° C. with decomposition, and they sensitized a photographic gelatino-silver-bromoiodide emulsion from about 560 mμ to about 680 mμ with maximum sensitivity at about 640 mμ.

Example 12.—2-(3-carbethoxymethyl-4-oxo-2-thiono-5-thiazolidylidene)-3-ethyl-5-[(3-ethyl-4-phenyl-2(3)-benzothiazolylidene)ethylidene]-4-thiazolidone

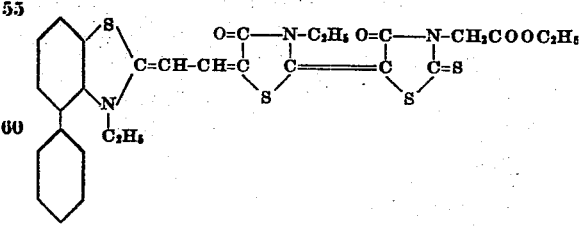

3 g. (1 mol.) of 3-ethyl-5-[3-ethyl-4-phenyl-2(3)-benzothiazolylidene)ethylidene] rhodanine and 5.28 g. (1 mol. + 300 per cent excess) of methyl p-toluenesulfonate were heated together in an oil bath at 150–160° C. for 45 minutes. The cool addition product was washed with several portions of ether. The residue of dark green crystals was stirred with acetone and the suspension was chilled at 0° C. The product was collected on a filter and washed with acetone; the yield was 52 per cent.

1.12 g. (1 mol.) of the above addition product, 0.4 g. (1 mol.) of 3-carbethoxymethylrhodanine, 10 cc. of ethyl alcohol and 0.19 g. (1 mol.) of triethylamine were heated at the refluxing temperature for 15 minutes. After chilling at 0° C., the dye was collected on a filter and washed with methyl alcohol. The yield of dye was 94 per cent crude and 82 per cent after two purifications by dissolving the dye in hot pyridine and adding an equal volume of methyl alcohol to the pyridine filtrate. The minute dark green needles had a melting point of 280–281° C. with decomposition and they sensitized a photographic gelatino - silver - bromoiodide emulsion from about 540 mμ to about 690 mμ with maximum sensitivity at about 645 mμ.

The yield of 2-(3-carbethoxymethyl-4-oxo-2-thiono - 5 - thiazolidylidene) - 3 - ethyl - 5 - [(3-methyl-4-phenyl-2(3)-benzothiazolylidene) ethylidene]-4-thiazolidone was 82 per cent crude and 69 per cent after two purifications by dissolving the dye in hot pyridine and adding an equal volume of methyl alcohol to the pyridine filtrate. The minute green crystals had a melting point of 281–282° C. with decomposition, and they sensitized a photographic gelatino-silver-bromoiodide emulsion from about 570 mμ to about 670 mμ with maximum sensitivity at about 640 mμ.

*Example 13. — 3-ethyl-5-[(3-ethyl-4-phenyl-2-(3)-benzothiazolylidene) - isopropylidene]-2-thio-2,4(3,5)-oxazoledione*

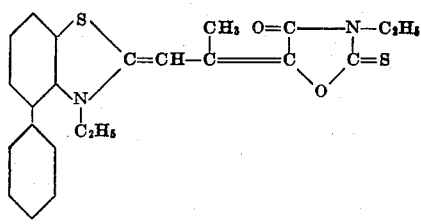

2.25 g. (1 mol.) of 2-methyl-4-phenylbenzothiazole and 2.00 g. (1 mol.) of ethyl p-toluenesulfonate were heated together in an oil bath at 115° C. for one week. To the crude quaternary salt were added 1.45 g. (1 mol.) of 3-ethyl-2-thio-2,4(3,5)-oxazoledione, 10 cc. of ethyl alcohol, 3.24 g. (1 mol. + 100 per cent excess) of ethyl orthoacetate and 1.01 g. (1 mol.) of triethylamine and the reaction mixture was heated at the refluxing temperature for five hours. After long chilling at 0° C., the dye was collected on a filter and washed with methyl alcohol. The yield of dye was 18 per cent crude and 7 per cent after one recrystallization from acetic acid (20 cc. per gram of dye). The red crystals with green reflex had a melting point of 179–181° C. with decomposition, and they sensitized a photographic gelatino-silver-bromoiodide emulsion to about 600 mμ with maximum sensitivity at about 565 mμ.

*Example 14.—3,3'-diethyl-4'-phenyloxathiacarbocyanine iodide*

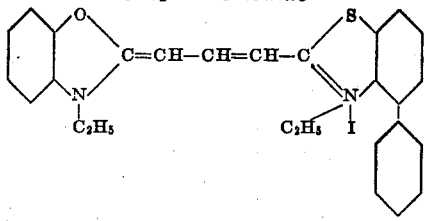

1.13 g. (1 mol.) of 2-methyl-4-phenylbenzothiazole and 1.00 g. (1 mol.) of ethyl p-toluenesulfonate were heated in an oil bath at 115° C. for one week. To the crude quaternary salt were added 2.17 g. (1 mol.) of 2-β-acetanilidovinylbenzoxazole ethiodide and 10 cc. of dry pyridine and the reaction mixture was heated at the refluxing temperature for 15 minutes. Diethyl ether was added to the cold reaction mixture and after chilling at 0° C., the ether-pyridine layer was decanted. The residue was stirred with water and the dye was collected on a filter and washed with water. The yield of dye was 10 per cent after three recrystallizations from methyl alcohol (47 cc. per gram of dye). The pale golden-bronze prisms had a melting point of 257–258° C. with decomposition, and they sensitized a photographic gelatino-silver-bromoiodide emulsion to about 590 mμ with maximum sensitivity at about 560 mu.

*Example 15.—1',3-diethyl-4-phenylthia-4'-dicarbocyanine perchlorate*

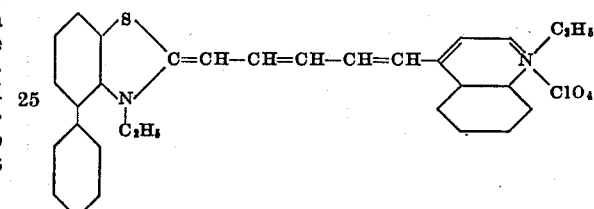

1.12 g. (1 mol.) of 2-methyl-4-phenylbenzothiazole and 1.00 g. (1 mol.) of ethyl p-toluenesulfonate were heated together in an oil bath at 110–115° C. for one week. To the crude quaternary salt were added 2.21 g. (1 mol.) of 4-(4-acetanilido-1,3-butadienyl)quinoline ethiodide, 10 cc. of ethyl alcohol and 1.01 g. of triethylamine and the reaction mixture was heated at the refluxing temperature for 15 minutes. After chilling overnight at 0° C., the cold mixture was filtered and the filtrate was stirred with ether. The ether-alcohol layer was decanted and the residue was stirred with water and the dye was collected on a filter. The dye was dissolved in methyl alcohol and the hot solution was treated with a hot solution of sodium perchlorate (2 g.) in water. After chilling at 0° C., the dye was collected on a filter and washed with water. The yield of dye was 3 per cent after two recrystallizations from methyl alcohol. The minute dark green crystals had a melting point of 169–174° C. with decomposition, and they sensitized a photographic gelatino-silver-bromoiodide emulsion from about 730mμ to about 810mμ with maximum sensitivity at about 780mμ.

*Example 16.—1,3-diethyl-5-[(3-methyl-4-phenyl-2(3)-benzothiazolylidene)ethylidene]-2-thiobarbituric acid*

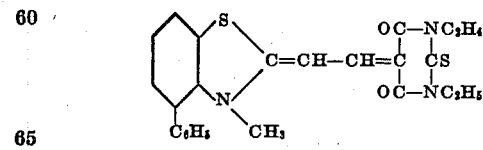

1.13 g. (1 mol.) of 2-methyl-4-phenylbenzothiazole and 0.93 g. (1 mol.) of methyl p-toluenesulfonate were heated together in an oil bath at 110–115° C. for 15 hours. To the crude quaternary salt were added 1.00 g. (1 mol.) of 1,3-diethyl-2-thiobarbituric acid, 15 cc. of ethyl alcohol, 1.48 g. (1 mol.+100 per cent excess) of ethyl orthoformate and 0.56 g. (1 mol.+5 per cent excess) of triethylamine. The reaction mixture was heated at the refluxing temperature for 4 hours. After chilling at 0° C., the dye was collected on a filter and thoroughly washed with methyl alcohol. The dye was purified by dissolving it in a small volume of hot pyridine, filtering and adding hot methyl alcohol to the hot pyridine filtrate. After two such purifications the yield of dye was 27 per cent. The dark red needles had melting point 255–257° C. with decomposition, and they sensitized a photographic gelatino-silver-bromoiodide emulsion from about 470 to about 560 m$\mu$ with maximum sensitivity at about 530 m$\mu$.

In the same manner shown in Example 2, 3′-ethyl-3-methyl-4′-phenyloxathiacyanine bromide can be prepared using a portion of 2-methylmercaptobenzoxazole metho-methylsulfate molecularly equivalent to the 2-methylmercaptobenzothiazole metho-methylsulfate. In the same manner shown in Example 14, 3,3′-diethyl-4′-phenylselenathiacarbocyanine bromide can be prepared using a portion of 2-β-acetanilidovinylbenzselenazole ethiodide molecularly equivalent to the 2-β-acetanilidovinylbenzoxazole ethiodide. In the same manner shown in Example 10, additional merocarbocyanine dyes can be prepared by replacing the 5-acetanilidomethylene-3-ethylrhodanine with molecularly equivalent amounts of 5-acetanilidomethylene - 3 - phenylrhodanine, 5-acetanilidomethylene-3-ethyl - 2 - thio - 2,4(3,5) - oxazoledione, 5-acetanilidomethylene-3-methylrhodanine, 5-acetanilidomethylene-3-β-hydroxyethylrhodanine, 5 - acetanilidomethylene - 3 - β-naphthylrhodanine, 5 - acetanilidomethylene - 3-ethyl-1-phenyl-2-thiohydantoin, 4 - acetanilidomethylene-3-methyl-1-phenyl-5-pyrazolone, 4-acetanilidomethylene-1-benzothiazolyl-3-methyl-5-pyrazolone, 5-acetanilidomethylene-2-diphenylamino-4(5) - thiazolone, 5 - acetanilidomethylene-3-laurylrhodanine, etc. In the same manner shown in Example 13, additional chain-substituted merocarbocyanine dyes can be prepared by replacing the 3-ethyl-2-thio-2,4(3,5)-oxazoledione with 3-ethylrhodanine, rhodanine, 3-phenylrhodanine, 3-ethyl-1-phenyl-2-thiohydantoin, 1,3-diphenyl-2-thiohydantoin, etc.

We have found that our new dyes spectrally sensitized photographic silver halide emulsions when incorporated therein. The dyes are especially useful for extending the spectral sensitivity of the customarily employed gelatino-silver-chloride, gelatino-silver-chlorobromide, gelatino-silver-bromide, gelatino-silver-bromoiodide and gelatino-silver - chlorobromoiodide developing - out emulsions. In the foregoing examples, the sensitizing effect of various of the dyes on at least one gelatino-silver-halide developing-out emulsion is pointed out.

To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol has proved satisfactory as a solvent for our new dyes, in most cases. Where the dyes are quite insoluble in alcohol, a mixture of acetone and pyridine may be employed as a solvent. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art upon making the ordinary tests and observations customarily used in the art of emulsion making. To prepare a gelatino-silver-halide emulsion sensitized with one or more of our new dyes the following procedure is satisfactory: A quantity of dye is dissolved in methyl alcohol (or a mixture of acetone and pyridine) and a volume of this solution, which may be diluted with water, containing from 5 to 100 mg. of dye is slowly added to about 1000 cc. of gelatino-silver-halide emulsion with stirring. Stirring is continued until the dye is thoroughly dispersed in the emulsion.

With most of our dyes from 10 to 20 mg. of dye per liter of gelatino-silver-bromide or bromoiodide emulsion (containing about 40 grams of silver halide) suffice to produce the maximum sensitizing effect. With the finer grain emulsions, somewhat larger concentration of dye may be needed to produce the maximum sensitizing effect.

The above statements are only illustrative, as it will be apparent that the dyes will be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film resin film or paper in the usual manner.

What we claim as our invention and desire to be secured by Letters Patent of the United States is:

1. A compound selected from those represented by the following formulas

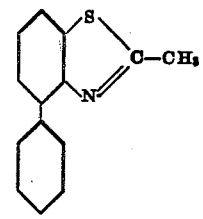

and

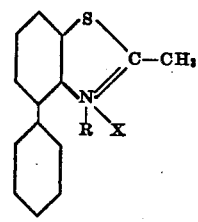

wherein R represents an alkyl group and X represents an anion.

2. 2-methyl-4-phenylbenzothiazole having the following formula:

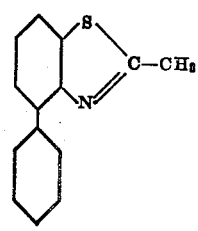

3. The quaternary salts which are represented by the following general formula:

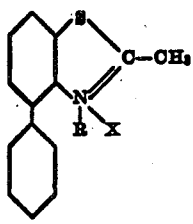

wherein R represents an alkyl group and X represents an anion.

4. The quaternary salts which are represented by the following general formula:

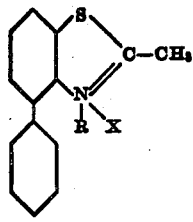

wherein R represents a primary alkyl group of the formula $C_mH_{2m+1}$ wherein $m$ represents a positive integer of from 1 to 4, and X represents an anion.

5. The quaternary salts which are represented by the following general formula:

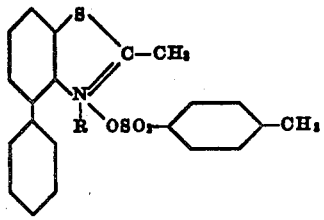

wherein R represents a primary alkyl group of the formula $C_mH_{2m+1}$ wherein $m$ represents a positive integer of from 1 to 4.

6. The quaternary salt which is represented by the following formula:

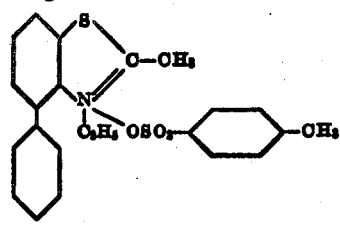

7. The quaternary salt which is represented by the following formula:

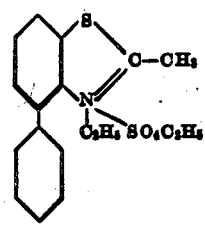

8. A process for preparing 2-methyl-4-phenyl-benzothiazole comprising oxidizing o-thioacetamidobiphenyl with an alkali metal ferricyanide.

9. A process for preparing 2-methyl-4-phenyl-benzothiazole comprising oxidizing o-thioacetamidobiphenyl with an alkali metal ferricyanide, in the presence of an alkali metal hydroxide.

10. A process for preparing 2-methyl-4-phenyl-benzothiazole comprising oxidizing o-thioacetamidobiphenyl with potassium ferricyanide in the presence of sodium hydroxide.

GERTRUDE VAN ZANDT.
LESLIE G. S. BROOKER.

REFERENCES CITED

The following references are of record in the file of this patent:

UNITED STATES PATENTS

| Number | Name | Date |
| --- | --- | --- |
| 2,126,078 | Zeh | Aug. 9, 1938 |
| 2,338,782 | Riester | Jan. 11, 1944 |
| 2,354,524 | Kumetal | July 25, 1944 |
| 2,369,657 | Brooker | Feb. 20, 1945 |